Dec. 14, 1965  W. A. FRYE  3,222,952
STEERING WHEEL
Filed June 13, 1963  2 Sheets-Sheet 1
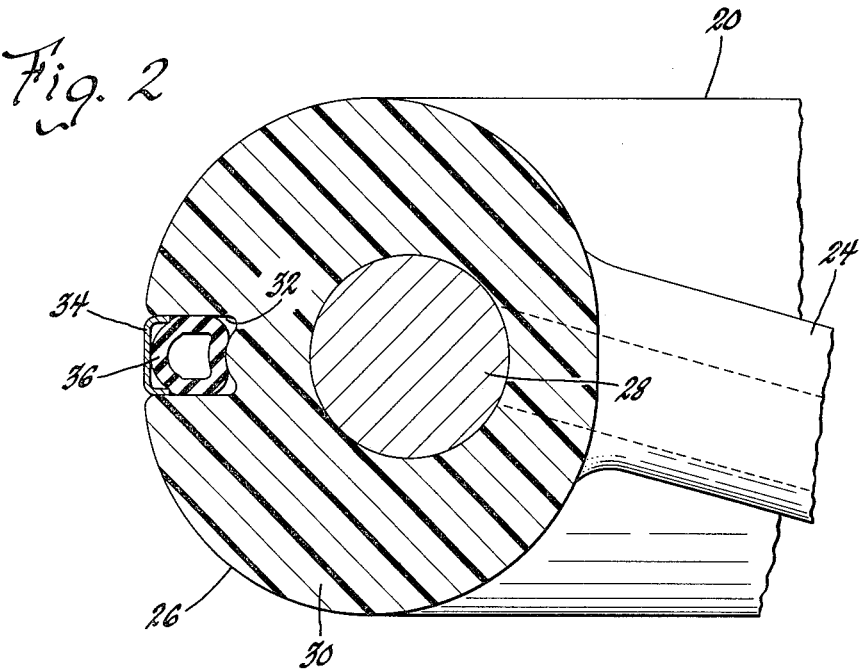
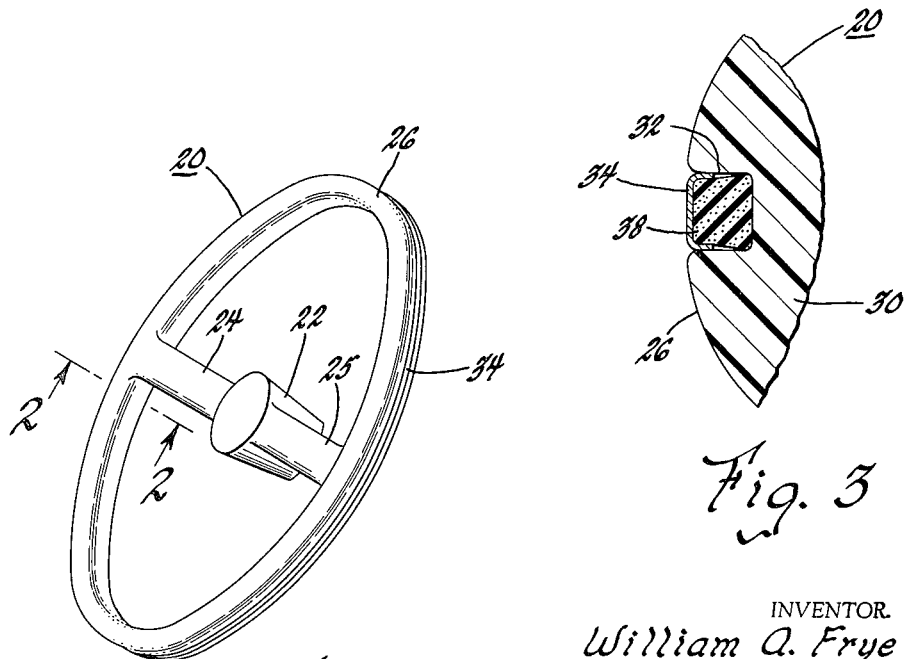
INVENTOR.
William A. Frye
BY
HIS ATTORNEY

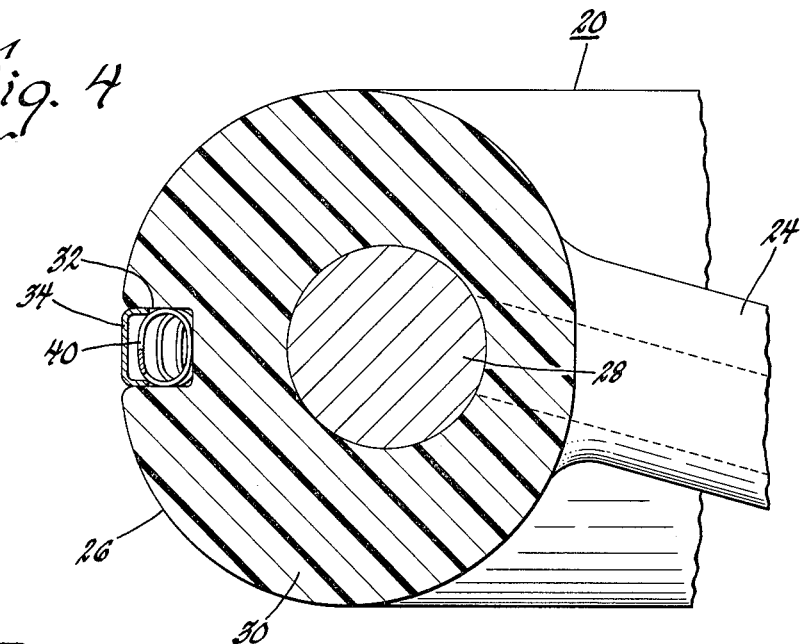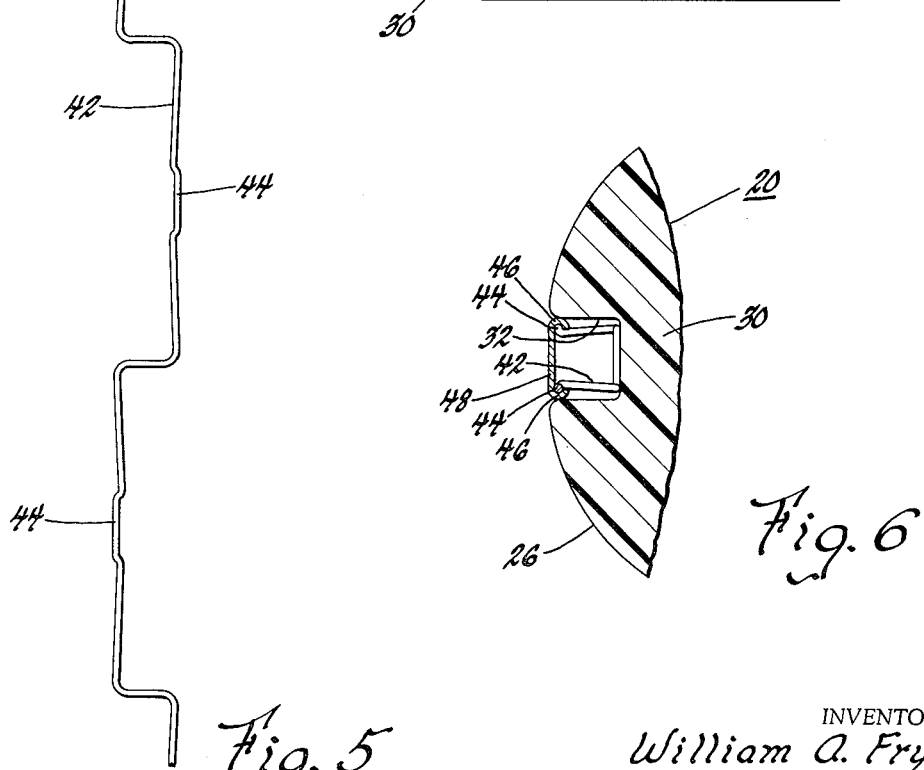

United States Patent Office 3,222,952
Patented Dec. 14, 1965

3,222,952
STEERING WHEEL
William A. Frye, Dayton, Ohio, assignor to General Motors Corporation, Detroit, Mich., a corporation of Delaware
Filed June 13, 1963, Ser. No. 287,659
11 Claims. (Cl. 74—552)

This invention relates to steering wheels and is particularly concerned with ornamental steering wheels including trim bands around the periphery thereof.

It is an object of the invention to provide a steering wheel comprising a hub, spokes and rim with ornamental band around the periphery of the rim which can be easily assembled thereto and which has an outer diameter substantially equal to the outer diameter to the steering wheel rim.

In carrying out the above object it is a further object to provide the rim with a circumferential groove at its major diameter and to utilize an ornamental band or hoop of the same outer diameter as the wheel which may be positioned in the groove, means being provided for maintaining the ornamental band centered with respect to said rim, said means being carried in the groove and comprising a resilient member or members.

Further objects and advantages of the present invention will be apparent from the following description, reference being had to the accompanying drawings wherein preferred embodiments of the present invention are clearly shown.

In the drawings:

FIGURE 1 is a perspective view of a conventional two-spoke steering wheel.

FIGURE 2 is an enlarged view through a rim section of the steering wheel showing the ornamental band in place.

FIGURE 3 is a view similar to FIGURE 2 showing another type of resilient back-up member for the band.

FIGURE 4 is a view similar to FIGURE 2 with still another type of resilient back-up member being shown.

FIGURE 5 shows another modification of the resilient means while

FIGURE 6 illustrates how the resilient means in FIGURE 5 may be attached to the ornamental band.

This invention is directed to ornamentation for automotive steering wheels that is easy to apply and which may be assembled to the wheel after it is completely fabricated. These wheels generally include a spider comprising a rim and spokes made of a steel rod wherein the spokes are welded to a hub. This spider is next placed in a mold and a covering of hard rubber or plastic material is molded over the rim portion thereof which covering includes hand grip portions and the like for making the rim functional and ornamental. The central portion of the spokes and hubs is generally covered with an ornamental horn blowing ring or other conventional device.

A metallic trim on the rims of these wheels presents a problem if it is applied during the manufacture of the wheel. Obviously, during the molding step molding compound frequently covers all or portions of the ornamental band and must be scraped off etc., requiring substantial labor which increases the cost of the wheel and in some instances requires reworking of the band in order to make the same of an ornamental appearance.

The present invention is directed specifically to a means for applying ornamental bands to the periphery of automotive steering wheels in a facile manner wherein the band is easily applied after the wheel has been finished and wherein the band is of substantially the same outer diameter as the major diameter of the wheel.

Referring to the drawings, FIGURE 1 shows a steering wheel at 20 having a hub 22, two spokes 24 and 25 and a rim 26. The rim 26 is shown in cross section in FIGURES 2, 3 and 4 and includes a reinforcing metallic spider portion 28 with a hard rubber or plastic covering 30 thereover.

In order to carry out my invention a circumferential groove 32 is either cut or molded into the outer periphery of the major diameter of the rim and the trim band or hoop 34 is applied to this groove. The hoop 34 may be of any desired material, preferably metal such as polished stainless steel. The outer diameter of the hoop 34 is substantially equal to the outer diameter of the wheel rim 26 and the width of the hoop 34 should be slightly less than the width of the groove 32 so that no substantial clearance is present.

In order to hold the hoop 34 centrally of the wheel rim and to permit the same to be assembled to the wheel after the rim has been completely molded, I utilize a resilient filler 36 for the groove which may take various forms. In FIGURE 2 this filler is a tube of rubber-like material. In the assembly of the ornamental band which is in the form of a continuous hoop, the band is started on one side of the groove and is depressed against the resilient filler to below its level of the wheel rim by means of suitable fixtures. The same procedure is used progressively around the rim. This permits the band to enter the groove all the way around the wheel rim and as soon as this is accomplished, release of pressure against the band permits the resilient back-up or filler to center the band with respect to the wheel and maintain it in central position therewith. In FIGURE 3 in place of a rubber-like tube, a ring of sponge rubber 38 is used as a means for backing up of the ornamental band. In FIGURE 4 the same result is accomplished by utilizing a garter spring 40.

FIGURES 5 and 6 show still other means for obtaining the same result wherein one or more spring-like members 42 are used and are placed in the groove. These members have portions 44 that may be snapped into channels 46 formed in a trim band 48 as noted in FIGURE 6. In this instance the spring-like member or members may be depressed at the raised sections including the portions 44 progressively whereby the trim band may be entered and positioned. Thereafter the spring members and particularly the portions 44, are held in the channel section 46 of the band 48.

It is also apparent that the spring members may be formed directly on the band if desired, although this requires more expensive die equipment and does not improve the action. In fact, in general resilient back-up members such as sponge rubber strips or elastomeric tubes are preferred due to the low cost and ease of assembly.

While the embodiments of the present invention as herein disclosed constitute preferred forms, it is to be understood that other forms might be adopted.

What is claimed is as follows:

1. A steering wheel comprising a hub, spokes and rim connected to the hub by said spokes, said rim having a circumferential groove extending inwardly of the rim from its major diameter, a continuous ornamental band having an outside diameter substantially equal to the major diameter of said rim and an inside diameter greater than the inside diameter of said groove and positioned in and carried loosely by said groove, and resilient means cooperating with said band and rim groove for positioning said band in said rim groove for resiliently centering the band with respect to the groove and the rim.

2. The steering wheel claimed in claim 1 wherein the resilient means comprises an elastomeric strip carried within said groove.

3. The steering wheel claimed in claim 1 wherein the resilient means comprises one or more resilient metallic spring elements.

4. The steering wheel claimed in claim 1 wherein the resilient means comprises a garter spring.

5. The steering wheel claimed in claim 1 wherein the resilient means is carried by said band.

6. A steering wheel comprising in combination, a hub, spokes and rim connected with the hub by said spokes, said rim including a circumferential groove therearound extending inwardly from the outer diameter thereof, a resilient filler in said groove and an ornamental band of continuous extent having an outer diameter substantially equal to the outer diameter of said rim positioned in said groove and held centrally of said rim by said filler.

7. The steering wheel claimed in claim 6 wherein the filler is a garter spring.

8. The steering wheel claimed in claim 6 wherein the filler is a ring of elastomeric material.

9. The steering wheel claimed in claim 6 wherein the elastomeric filler within said groove has an outside diameter slightly less than the outside diameter of the rim.

10. A steering wheel comprising in combination, a hub, spokes and rim connected with the hub by said spokes, said rim including a circumferential groove therearound extending inwardly from the outer diameter thereof, a resilient filler in said groove and an ornamental band of continuous extent having an outside diameter equal to the outside diameter of the rim and an inside diameter slightly less than the outside diameter of the filler whereby the filler is compressed by the ring for causing the band to be maintained in centered relation to the rim.

11. A steering wheel as claimed in claim 10 wherein the band has a channel-shaped cross section receiving a portion of the filler therein.

References Cited by the Examiner
UNITED STATES PATENTS 2,801,592  5/1937  Lyon _____ 74—552
2,801,593  5/1937  Lyon _____ 74—552

MILTON KAUFMAN, *Primary Examiner.*